US008472961B2

United States Patent
Makabe

(10) Patent No.: US 8,472,961 B2
(45) Date of Patent: *Jun. 25, 2013

(54) METHOD AND SYSTEM FOR PERFORMING A HANDOFF IN A WIRELESS COMMUNICATION SYSTEM

(75) Inventor: Takeshi Makabe, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/434,754

(22) Filed: Mar. 29, 2012

(65) Prior Publication Data

US 2012/0190401 A1    Jul. 26, 2012

Related U.S. Application Data

(63) Continuation of application No. 12/361,499, filed on Jan. 28, 2009, now Pat. No. 8,170,561, which is a continuation-in-part of application No. PCT/JP2007/063028, filed on Jun. 28, 2007.

(30) Foreign Application Priority Data

Jul. 28, 2006 (JP) .................................. 2006-207154

(51) Int. Cl.
*H04W 36/00* (2009.01)
(52) U.S. Cl.
USPC ....................................................... 455/437
(58) Field of Classification Search
USPC ....................................................... 455/437
See application file for complete search history.

(56) References Cited

U.S. PATENT DOCUMENTS

| 6,064,890 A | 5/2000 | Hirose et al. |
| 6,459,689 B1 | 10/2002 | Czaja et al. |
| 2002/0107020 A1* | 8/2002 | Lee ................................ 455/436 |
| 2005/0003817 A1 | 1/2005 | Ormson et al. |
| 2005/0192012 A1 | 9/2005 | Choi et al. |

FOREIGN PATENT DOCUMENTS

| JP | 2002-325271 A | 11/2002 |
| JP | 2004-242139 A | 8/2004 |
| JP | 2005311498 | 11/2005 |

OTHER PUBLICATIONS

International Search Report for PCT/JP2007/063028, mailed on Jul. 31, 2007, 2 pages.

* cited by examiner

*Primary Examiner* — Melvin Marcelo
(74) *Attorney, Agent, or Firm* — Duane Morris LLP

(57) ABSTRACT

A system for maintaining wireless communication with a plurality of base stations in a communication network is disclosed. A portable terminal having a communication unit is configured to measure signal strength of a transmission signal for neighboring base stations in a frequency band being used by the communication unit, and create a first handoff candidate list in which one or more handoff candidates in a same frequency band are recorded. A handoff using the first handoff candidate list is performed by the portable terminal. Thereafter, the portable terminal measures signal strength of one or more base stations included in a second handoff candidate list. The result of the signal strength measurements are reported to the currently communicating base station, and a handoff is performed based on a response to the report at the portable terminal.

10 Claims, 8 Drawing Sheets

FIG.7

| BASE STATION IDENTIFYING CODE | MEASUREMENT RESULT (db) |
|---|---|
| 80 | -5 |
| 104 | -7 |
| 88 | -8 |
| 204 | -8 |
| 108 | -12 |
| 84 | -15 |

FIG.8

| BASE STATION IDENTIFYING CODE |
|---|
| 40 |
| 60 |
| 80 |
| 84 |
| 88 |
| 104 |
| 108 |
| 204 |

METHOD AND SYSTEM FOR PERFORMING A HANDOFF IN A WIRELESS COMMUNICATION SYSTEM

CROSS-REFERENCE TO RELATED APPLICATIONS

This application is a continuation of U.S. patent application Ser. No. 12/361,499 filed Jan. 28, 2009, now allowed, which is a continuation in part of PCT Application No. PCT/JP2007/063028, filed Jun. 28, 2007, which claims the benefit of Japanese Application No. 2006-207154, filed Jul. 28, 2006, both entitled "MOBILE TERMINAL DEVICE AND HANDOFF METHOD." The disclosures of these applications are incorporated by reference herein in their entirety.

BACKGROUND OF THE INVENTION

1. Field of the Invention

The invention relates generally to a method and system for performing a handoff in a wireless communication system.

2. Description of the Related Art

Recently, the reorganization of frequency bands has been an issue in making effective use of a frequency band used in a wireless communication system and in conforming the frequency band to the global standard. For example, though the 800 MHz band of the Japanese standard (hereinafter, referred to as an old 800 MHz band) is used for current communication using CDMA2000 1x (Code Division Multiple Access 2000 1x) in Japan, the frequency band is scheduled to be reorganized to a new 800 MHz band as the global standard. The new 800 MHz band is different from the old 800 MHz band in the upstream and downstream allocations of the frequency band to be used. Therefore, a multiband compatible portable terminal which can establish a communication in three frequency bands, the current frequency band (old 800 MHz band), the new frequency band (new 800 MHz band), and the high frequency band (2 GHz band), has been developed.

In the CDMA2000 1x, one base station has one or more sectors divided according to pilot codes, and one channel for communication is assigned to each sector. The portable terminal communicates with the base station with one of the channels, respectively. Hereinafter, a description will be made using an example in which one pilot code corresponds to one base station (in other words, only one channel is assigned to one base station).

The above-described multiband compatible portable terminal uses a plurality of frequency bands, as does the wireless communication system. When the portable terminal moves, for example, the currently communicating base station has to be switched to another base station of a different frequency band.

A function of switching a base station (communication channel) for continued communication is called a handoff (or hand over). The handoff may include a soft handoff and a hard handoff.

The soft handoff refers to a handoff performed without switching frequency, which is a handoff method inherent in CDMA systems. After simultaneously communicating with both the currently communicating base station (original handoff channel) and a new base station (handoff destination channel) temporarily, a switching process of the base stations is performed. Specifically, a portable terminal receives a neighboring base station list transmitted by the currently communicating base station, measures the signal strength of a pilot signal of each base station in the list, and transmits the measurement results to the currently communicating base station. The base station determines a handoff destination base station according to the received measurement results. The soft handoff is led by the base station.

As described above, in the soft handoff, since the portable terminal always communicates with one or more base stations, communication is not interrupted at a time of handoff. However, when two base stations cannot provide a service to the portable terminal at the same frequency, the soft handoff is impossible. Therefore, the soft handoff cannot be used in the case of switching the base station to one using a different frequency band. In such a case, the hard handoff is performed.

The hard handoff in the CDMA2000 1x method of the IMT-2000 standard includes two methods: DAHHO (Data Assisted Hard Hand Off) and MAHHO (Mobile Assisted Hard Hand Off).

The DAHHO is a method of carrying out a handoff to a second base station directly specified by a first base station without a search by a portable terminal for another frequency before the handoff.

In other words, in the DAHHO, since the first base station specifies the second base station unilaterally without referring to the information of the portable terminal, there is no guarantee that the portable terminal can acquire the second base station specified by the first base station. Therefore, a possibility of handoff error is comparatively high.

On the other hand, in the MAHHO, the portable terminal receives a neighboring base station (channel) list with different frequency bands specified by the currently communicating base station, switches the frequency to the frequency of the specified list only at the moment specified by a search instruction from the first base station, and searches for a base station (channel) in the list. After the portable terminal measures the energy intensity of the pilot signals from all the base stations (channels) in the list, the portable terminal switches the frequency to the original frequency again and reports the measured energy intensities of all the base stations (channels) to the first base station. The first base station determines the second base station from the base stations in the list according to the reported energy intensities and transmits to the portable terminal an instruction for switching the communication to the second base station. The portable terminal carries out the handoff according to the instruction.

In the above described MAHHO, when the portable terminal measures the energy intensities of the pilot signals of all the base stations in the base station list received from the first base station, the portable terminal temporarily switches the frequency used for communication with the first base station to the frequency used for communication with the base stations in the list, and thus communication with the first base station is interrupted temporarily and a momentary break occurs. Accordingly, there is a disadvantage in that a silence occurs during a voice call.

In order to prevent the momentary break, the number of times and the time for switching the frequency may be limited. In order to reduce the number of times and the time for switching the frequency, the number of the base stations (channels) which measure the energy intensities of the pilot signals may be reduced.

In the conventional MAHHO, however, if the number of the measured base stations (channels) is reduced, there is a possibility that an effective base station (channel) cannot be found as a handoff destination and that the portable terminal fails the handoff.

Therefore, a system and a handoff method for preventing a momentary break occurring in the MAHHO are required.

SUMMARY OF THE INVENTION

The exemplary embodiments described herein are directed to solving one or more of the problems presented in the prior art, as described above, as well as providing additional features that will become readily apparent by reference to the following detailed description when taken in conjunction with the accompanying drawings.

One embodiment of the present invention is directed to a portable terminal device which maintains wireless communication with a plurality of base stations in a communication network. The portable terminal devices includes a communication unit communicable in a plurality of frequency bands and configured to select one frequency band from the plurality of frequency bands to perform wireless communication; and a control unit configured to change the frequency band for use in the wireless communication by the communication unit to perform the wireless communication. According to one embodiment, the control unit includes a first handoff processing unit which, when a neighboring base station list including information of one or more neighboring base stations is received from a currently communicating base station, measures a signal strength of a transmission signal for each of the one or more neighboring base stations in the frequency band being used by the communication unit, creates a first handoff candidate list in which one or more handoff candidates in a same frequency band are recorded in decreasing order of signal strength, and performs a handoff using the first handoff candidate list. The control unit may also include a second handoff processing unit which, when a second handoff candidate list including information for switching the communicating frequency band and one or more different frequency band handoff candidates is received from a currently communicating base station, measures signal strength of one or more base stations included in the second handoff candidate list, reports the result of the signal strength measurement to the currently communicating base station, and performs a handoff based on a response to the report upon receipt of the response from the communication unit.

Another embodiment of the present invention is directed to a handoff method for maintaining wireless communication in a wireless communication system comprising a plurality of base stations and a portable terminal device configured to perform wireless communication with one or more of the plurality of base stations. The method may include receiving a neighboring base station list including information on one or more neighboring base stations from a currently communicating base station; measuring signal strength of a transmission signal for each of the one or more neighboring base stations in a currently used frequency band; generating a first handoff candidate list in which one or more handoff candidates of the same frequency band as the currently used frequency band are recorded in decreasing order of signal strength determined by the measuring of the signal strength of the transmission signal for each of the one or more neighboring base stations; performing a handoff using the first handoff candidate list without switching the used frequency band; receiving a second handoff candidate list including switching information of the used frequency band and one or more different frequency band handoff candidates from the currently communicating base station; switching communication to a frequency band based on the switching information, and measuring a signal strength of the one or more handoff candidates included in the second handoff candidate list; reporting the result of the measured signal strength of the one or more handoff candidates to the currently communicating base station using the original frequency band; receiving a response to the reporting at the portable terminal; and performing a handoff based on the response.

BRIEF DESCRIPTION OF THE DRAWINGS

Exemplary embodiments of the invention are described in detail below with reference to the following Figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure.

FIG. 7 shows an example of an E-List according to one embodiment of the invention.

FIG. 8 shows an example of a handoff candidate base station list according to one embodiment of the invention.

DETAILED DESCRIPTION OF EXEMPLARY EMBODIMENTS

Figure 1:
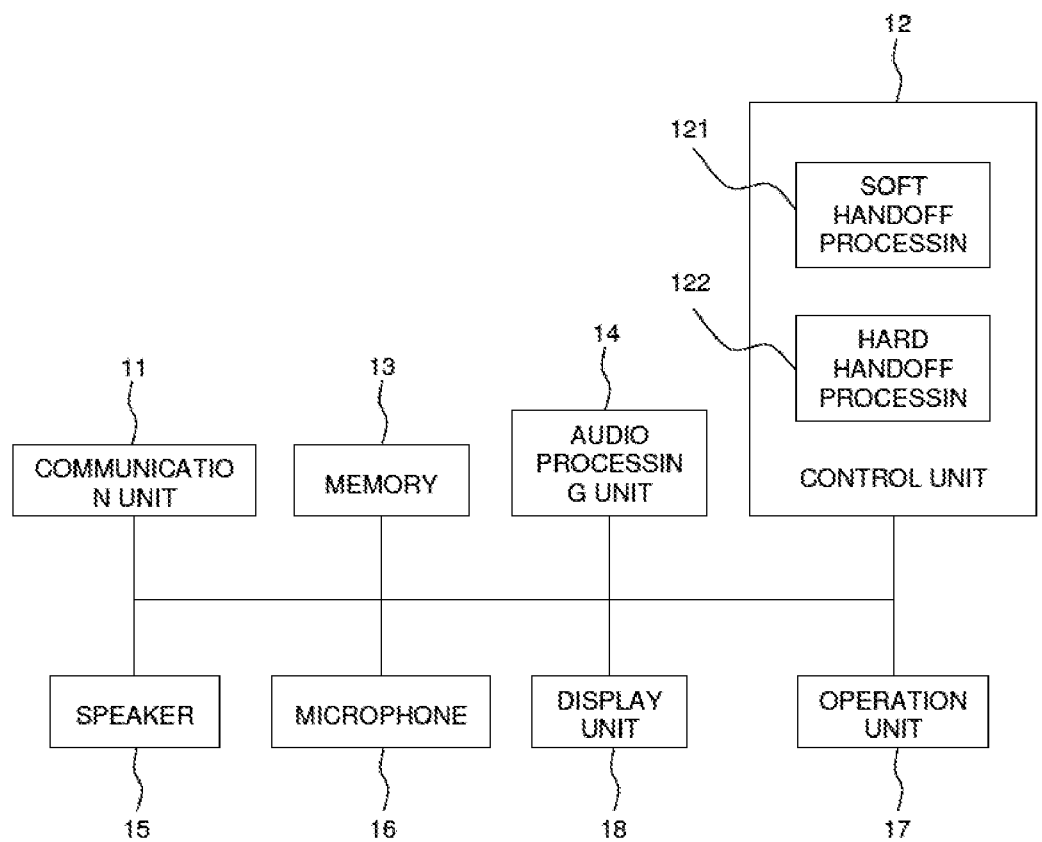
FIG. 1 is a block diagram showing an example of the structure of a portable terminal according to one embodiment of the invention.

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in an exemplary order, and are not meant to be limited to the specific order or hierarchy presented.

A wireless communication system according to one embodiment of the invention will be described.

A wireless communication system 100, according to one embodiment, includes a portable terminal 1 and a plurality of base stations 2, which are described in further detail below with reference to FIGS. 1 and 3.

Although the wireless communication system 100, according to certain embodiments, has only one portable terminal 1, it is only one example and the wireless communication system may have any number of portable terminals 1.

In the embodiment, the portable terminal 1 and the base station 2 in the wireless communication system communicate, for example, using the CDMA2000 1x method.

The exemplary wireless communication system 100 may be one in which three frequency bands can be used: a current old 800 MHz band which has been conventionally used in CDMA2000 1x, a new 800 MHz band of a frequency band at least a little different from that of the conventional one, and a higher frequency band (for example, 2 GHz).

As shown in FIG. 1, the exemplary portable terminal 1 has a communication unit 11, a control unit 12, a memory (storage unit) 13, an audio processing unit 14, a speaker 15, a microphone 16, a display unit 17, and an operation unit 18. Of course, the portable terminal 1 shown in FIG. 1 is only one example, and various combinations of these and other components may be included.

The communication unit 11 transmits and receives wireless signals to and from a base station 2 through a channel assigned to the base station 2. The communication unit 11 can transmit and receive wireless signals in a plurality of frequency bands. Specifically, a communication can be established in each of the old 800 MHz band, the new 800 MHz band, and the 2 GHz band.

Each of the frequency bands is different from each other and is assigned a band class defined by the 3GPP2 (3rd Generation Partnership Project 2) as an identification number for identifying the frequency band between the base station 2 and the portable terminal 1. For example, the band class is used to transmit, to the portable terminal 1, broadcast information of the frequency bands of the respective base stations 2 existing near the portable terminal 1 in a neighboring base station list (hereinafter, referred to as a N-list: Neighbor-list) in the information supplied from one base station 2 to the portable terminal 1. For example, the old 800 MHz band is classified as Band class3, the new 800 MHz band is classified as Band class0, and the 2 GHz band is classified as Band class6. Priorities may be previously assigned to these frequency bands, for example, as follows: a first priority is given to the Band class6, a second priority is given to the Band class0, and the least priority is given to the Band class3. The Band class and priority described herein are only exemplary and depend on infrastructural circumstances of communication carriers. Various other Band class settings may be implemented without departing from the scope of the present disclosure.

The communication unit 11 identifies the frequency band to use for communication with the base station 2 according to the band class.

The control unit 12 may control the entire operation of the portable terminal 1. Specifically, the control unit 12 outputs an audio signal (audio data) included in a signal supplied from the communication unit 11 to the audio processing unit 14 and outputs an audio signal supplied from the audio processing unit 14 to the communication unit 11.

The control unit 12 carries out the processing for determining which frequency band of the above three is used for communication with the base station 2.

The control unit 12 makes the communication unit 11 perform a handoff according to a handoff request or the like from the base station 2. The control unit 12 includes a soft handoff processing unit 121 (first handoff processing means) and a hard handoff processing unit 122 (second handoff processing means).

The soft handoff processing unit 121 carries out the soft handoff processing based on a neighboring base station list obtained from the base station 2 through the communication unit 11 and includes measuring the signal strength of a pilot signal with each base station 2 in the list, and transmitting the measurement result to the currently communicating base station 2.

The hard handoff processing unit 122 performs the above-described hard handoff using the MAHHO. The detailed operation of the portable terminal 1 during handoff will be described later.

The control unit 12 measures the signal strength of the pilot signals from the base stations 2 (that is, the strength of a signal in every channel divided into the pilot signal and the strength of a channel signal to be used in a radio wave which can be received by the communication unit 11). As a method for measuring signal strength, for example, there is a method of measuring the energy intensity of the pilot signal, but the method is not limited in the invention. Various methods of measuring signal strength may be implemented without departing from the scope of the present invention.

The control unit 12 performs display control of the display unit 17 and performs various controls according to the operation of the operation unit 18.

Further, the control unit 12 controls the communication unit 11 to perform a position registration and an A_Persistence test described below on the base stations 2.

Hereinafter, the position registration and the A_Persistence test in a wireless terminal device (e.g., a CDMA terminal) will be briefly described using the terms defined in the 3GPP2.

One communication system (e.g., a frequency band) has a plurality of channels and each channel is assigned to one of the base stations 2. Each of the base stations 2 forms a sector according to the assigned channel and also forms a sector in another frequency band to cover the band. In other words, some of the base stations 2 may conform not only to a single frequency band but also to various kinds of frequency bands.

The portable terminal 1 performs the position registration (the act of informing the network of the position of the portable terminal 1 by transmitting a parameter such as the terminal ID) using one channel, and thereafter the portable terminal 1 can communicate with the base station 2. Specifically, at the time of starting up the portable terminal 1, the control unit 12 searches for a channel of a frequency band around the portable terminal. In other words, the control unit 12 controls the communication unit 11 to search the frequencies around the portable terminal one after another. There are various search methods, and, for example, the control unit 12 searches the channels sequentially starting from the channel belonging to the system of the highest priority (in the case of the CDMA2000 1x, primary and secondary channels). In each system, when there is a channel having sufficient signal strength, the portable terminal 1 operates to temporally synchronize with the channel. On the other hand, when there is no such channel, the portable terminal 1 searches a channel of the system of the next highest priority. Here, the temporal synchronization refers to a synchronization using a PN (Pseudo Noise) code. In the case of the CDMA2000 1x, the temporal synchronization refers to a state in which a paging channel can be received (e.g., a state in which broadcast information can be received). In the case of the CDMA EV-DO, the temporal synchronization refers to a state in which a control channel can be received (e.g., a stand-by mode).

To carry out position registration in the state where the portable terminal 1 is not connected to the Traffic of the communication system, the portable terminal 1 first performs the A_Persistence test for determining whether it is possible to make a transmission to the base station 2 in the stand-by mode.

The A_Persistence test is performed before the portable terminal 1 that is not connected to the base station 2 transmits a wireless signal to the base station 2. The A_Persistence test is performed to determine whether the portable terminal 1 can transmit the wireless signal to the base station 2. In other words, the A_Persistence test is performed for the purpose of preventing the base station 2 from receiving a large number of wireless signals at once from a plurality of portable terminals 1 and hence getting into a congested state. By performing the A_Persistence test, the portable terminal 1 can obtain a threshold which can be an indicator of resource space of the base station 2.

Specifically, when the portable terminal 1 that is not connected to the traffic transmits the position registration to the base station 2, the portable terminal 1 performs the transmission in the access channel. In particular, when the transmission is performed by using the access channel, the portable terminal 1 performs the transmission while increasing the transmission power by degrees at predetermined intervals. This is called an access attempt. As a parameter of an access attempt, the result of the A_Persistence Test is used.

The A_Persistence Test may be performed before supplying electric power to a transmitter included in the communication unit 11. Therefore, in the case of a message in the CDMA2000 1x, the A_Persistence Test is performed in the Message transmission of Registration, Origination, Page Response, and in the case of the EV-DO, it is performed in transmitting UATI Request, Route Update, and Connection Request.

In the A_Persistence Test, a value, called a threshold, is calculated by the control unit 12 according to the parameter supplied from the base station 2 and the type of the portable terminal 1 (e.g., for general use, for maintenance, and for emergency) c. The threshold is a value that is an indicator of the resource space in the base station 2, ranging from "0" to "63". When the threshold is small, it means that there is a lot of resource space in the base station 2, and conversely, when the threshold is large, it means that there is little resource space in the base station 2. In other words, when the threshold is small, many portable terminals can connect to the base station 2, while, when the threshold is large, for example, congestion occurs in the base station 2, which makes it difficult to establish a connection.

Figure 2:
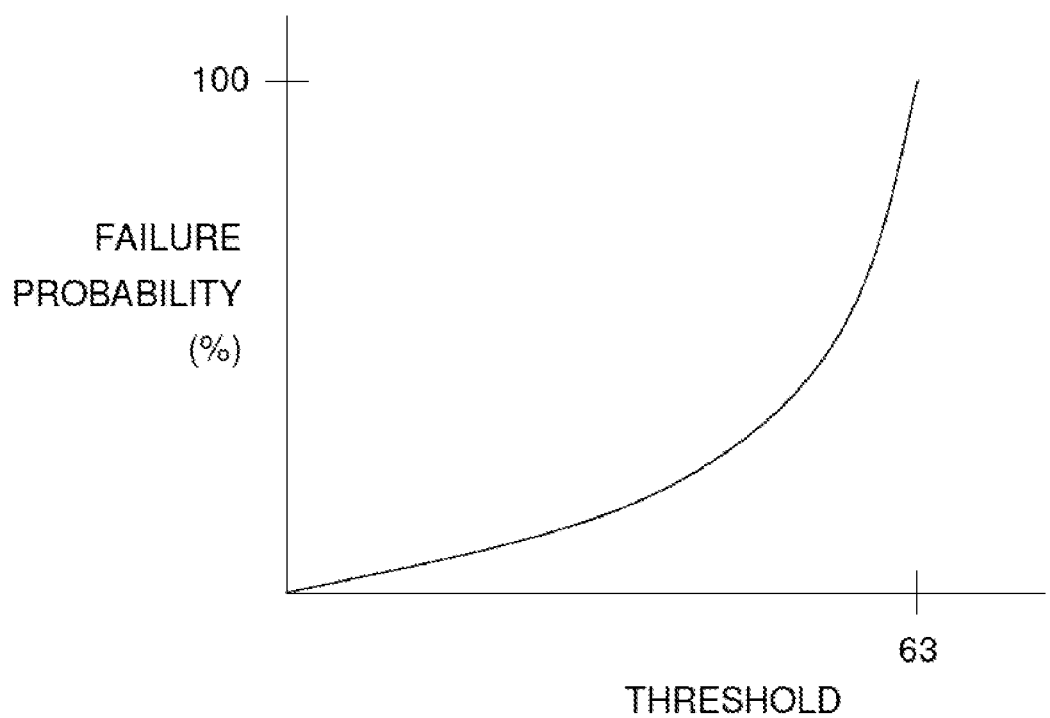
FIG. 2 is a graph showing a relation between probability of failure in connection to a base station and its threshold according to one embodiment of the invention.

In FIG. 2, the horizontal axis represents the threshold and the vertical axis represents a probability of failure in connection to the base station 2.

As shown in FIG. 2, the probability of failure is small when the threshold is small, but as the threshold becomes larger, the failure probability goes up in a quadric way. FIG. 2 shows that when the threshold is the minimum value "0", a connection to the base station 2 is succeeded in the probability of almost 100% and when the threshold is the maximum value "63", a connection to the base station 2 is failed in the probability of almost 100%.

Each threshold is calculated for each of the frequency bands described above: the current frequency band (old 800 MHz band), the new frequency band (new 800 MHz band), and the high frequency band (2 GHz band) and stored in the memory 13. Therefore, for example, there can be a state where the threshold in the high frequency band (2 GHz band) is high and the threshold in the current frequency band (old 800 MHz band) is low.

The memory 13 (see to FIG. 1) stores various data used by the control unit 12 for the above-described processing such as operation, calculation, expansion of information, and storage.

The audio processing unit 14 performs decompression, D/A (digital to analog) conversion and the like on an audio signal supplied from the control unit 12 and outputs the processed signal to the speaker 15. Further, the audio processing unit 14 performs A/D (analog to digital) conversion, compression and the like on an audio signal supplied from the microphone 16 and outputs the processed signal to the control unit 12.

The speaker 15 converts an audio signal supplied from the audio processing unit 14 into sound. The microphone 16 converts the supplied sound into an audio signal.

The display unit 17 includes, for example, a liquid crystal display and displays based on the signal supplied from the control unit 12.

The operation unit 18 has various operation keys such as a call key, a call-end key, a numerical key, and a soft key and outputs a signal corresponding to the user's operation to the control unit 12.

Next, the base station 2 will be described with reference to FIG. 3.

Figure 3:
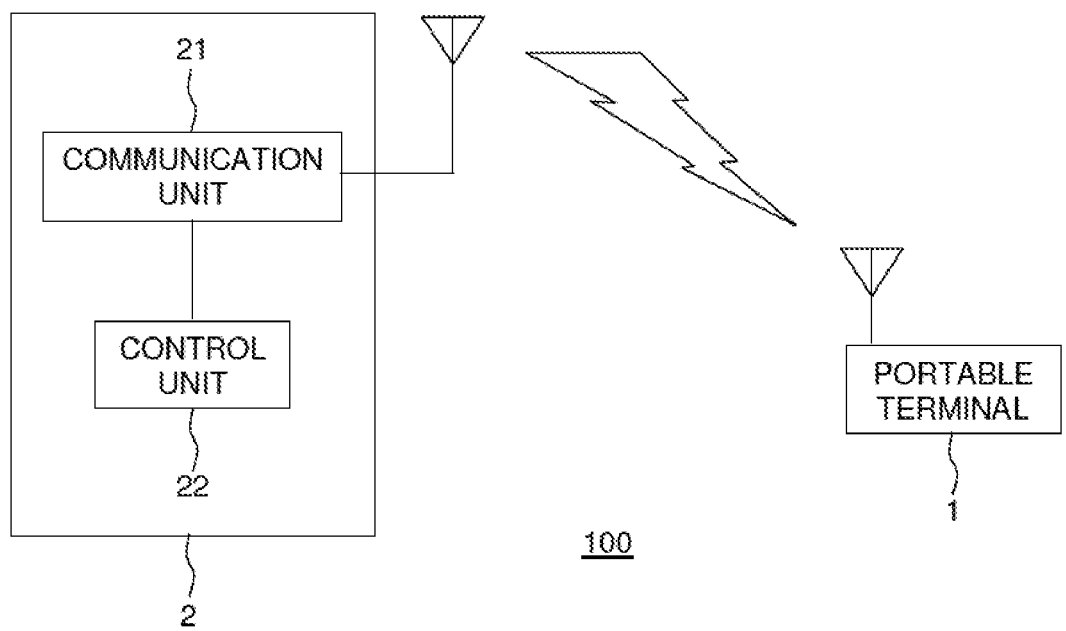
FIG. 3 is a block diagram showing an example of the structure of a base station and a wireless communication system according to one embodiment of the invention.

As shown in FIG. 3, the base station 2 includes a communication unit 21 and a control unit 22.

The communication unit 21 assigns a channel to the portable terminal 1 for transmitting and receiving a wireless signal to and from the portable terminal 1. The communication unit 21 can transmit and receive wireless signals in a plurality of frequency bands. Specifically, the communication unit 21 can transmit and receive a wireless signal using the current frequency band (old 800 MHz band), the new frequency band (new 800 MHz band), and the high frequency band (2 GHz band), similarly to the communication unit 11 included in the portable terminal 1.

The control unit 22 determines which frequency band of the above bands is used by the communication unit 21 to transmit and receive a wireless signal.

According to one embodiment, as described above, the base station 2 conforms to a communication in a plurality of frequency bands and uses the pilot signal according to the same PN code even when the frequency band for communication changes.

Figure 4:
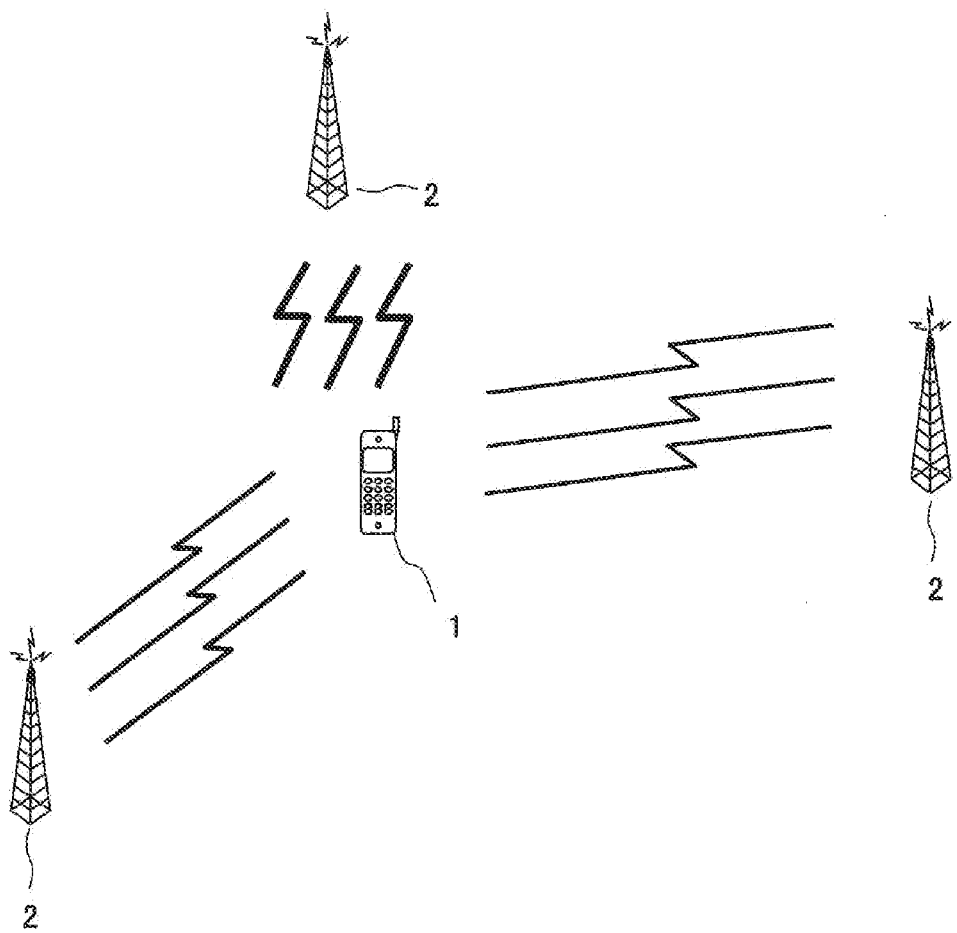
FIG. 4 is a conceptual view showing the strength of signal according to the positional relation between a portable terminal and base stations according to one embodiment of the invention.

FIG. 4 is a conceptual view showing the strength of the signals depending on the positional relation between the portable terminal 1 and the respective base stations 2 when each of the base stations 2 conforms to the above three kinds of the frequency bands and uses the same PN code in the three frequency bands. The thickness of the wavy line between each of the base stations 2 and the portable terminal 1 indicates the signal strength. The signal strength is the strength of the channel signal that can be received by the communication unit 21, for example.

The signal strength of a communication from the base station 2 is more affected by the positional relation between the portable terminal 1 and the base station 2 than a difference in the frequency band for the communication. Namely, the signal strength of the pilot signal is stronger when the portable terminal 1 is near the base station 2 and the signal strength is weaker when the portable terminal 1 is far from the station. As described above, when the base station 2 uses the same pilot signal, even when the frequency band for communication changes and when the portable terminal 1 obtains the pilot signal strength of one frequency supplied from the base station 2, the pilot signal strength in another frequency supplied from the base station 2 can be predicted to some degree in the portable terminal 1. This can help roughly estimate the distance relationship between the portable terminal 1 and the base station 2.

Next, an example of a handoff operation in the wireless communication system 100 according to one embodiment will be described with reference to FIG. 5.

In the embodiment, the handoff according to the MAHHO is performed for exemplary purposes.

First, an example of rough operation in the MAHHO mode in the wireless communication system will be described.

Figure 5:
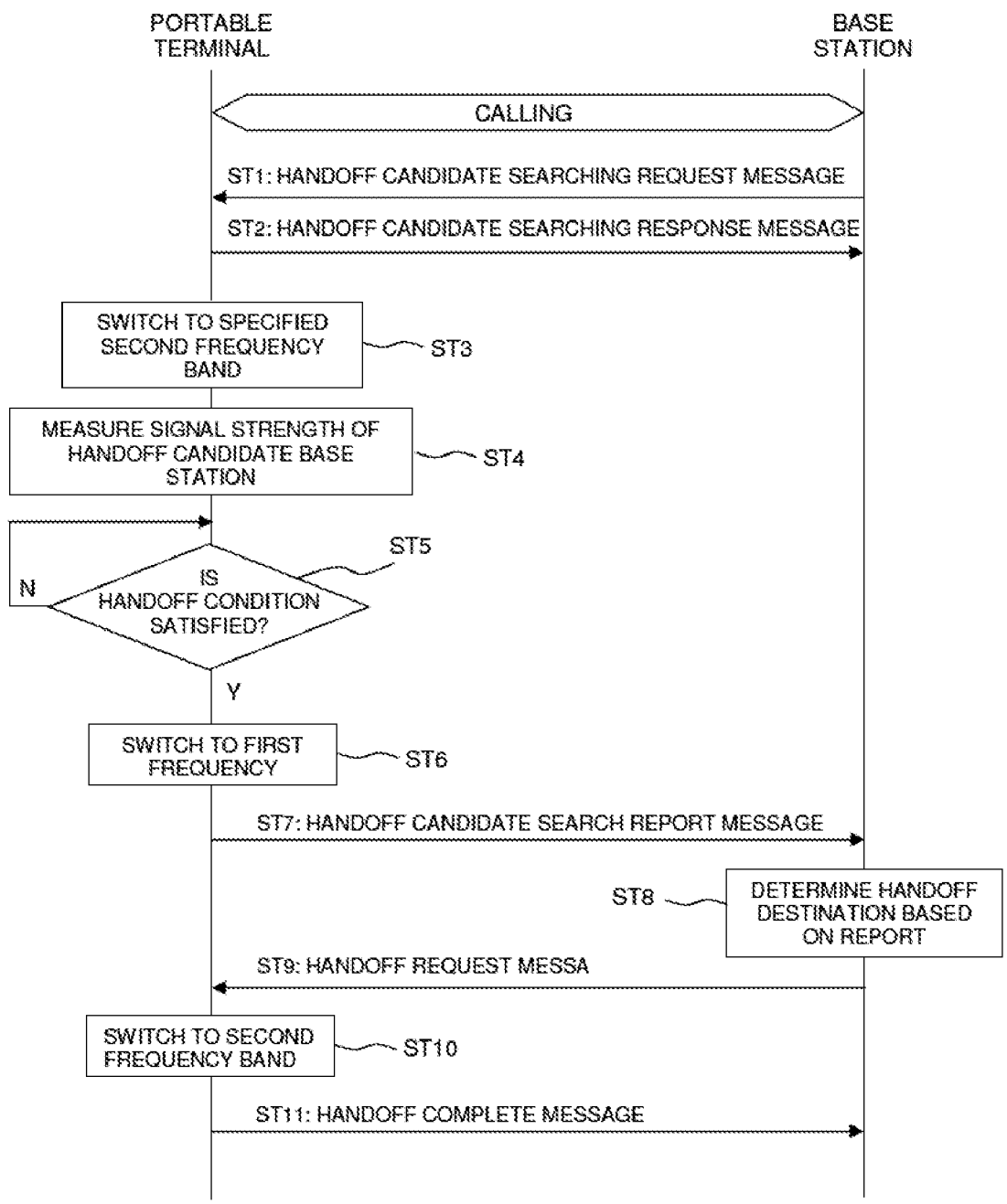
FIG. 5 is a sequence diagram showing an example of operations of a portable terminal and a base station when using the MAHHO in a wireless communication system, according to one embodiment of the invention.

In the operation example described in FIG. 5, it is assumed that the portable terminal and the base station are in a calling state (under communication) from the beginning.

Step ST1:

The base station 2 transmits a handoff candidate searching request message to the portable terminal 1. The handoff candidate searching request message refers to a message to make the portable terminal 1 search for a handoff candidate base station 2 in a frequency band (band class) different from the currently used frequency (first frequency band). The handoff candidate searching request message includes specification information of a new frequency (second frequency band) which the portable terminal 1 should switch to and a list of other base stations 2 (conforming to the new frequency band) existing near the portable terminal 1. Searching refers to measuring the signal strength of the pilot signal of a base station 2, as described herein.

Step ST2:

The portable terminal 1 transmits a handoff candidate searching response message to the base station 2. The handoff candidate searching response message is a response message of acknowledgment to the handoff candidate searching request message transmitted from the base station 2 in Step ST1.

Step ST3:

The portable terminal 1 switches the frequency band for communication to the specified frequency band (second frequency band) according to the specification information of the new frequency band indicated in the handoff candidate searching request message transmitted in Step ST1.

Step ST4:

In the frequency band switched in Step ST3, the portable terminal 1 measures the signal strength of the pilot signal of all the base stations 2 included in the list of other base stations 2 existing near the portable terminal 1 indicated in the handoff candidate searching request message in Step ST1.

Step ST5:

The portable terminal goes to Step ST6 when there is a base station 2 satisfying a predetermined handoff condition in all the base stations 2 measured in Step ST4, and goes back to Step ST4 when there is no such base station 2. The predetermined handoff condition is a condition such that, for example, the signal strength is a predetermined value. Of course, one of ordinary skill in the art would realize that other conditions may be included within the predetermined handoff condition.

Step ST6:

The portable terminal 1 switches the switched frequency again to the original frequency used during the communication with the base station 2 in Step ST1.

Step ST7:

The portable terminal 1 transmits a handoff candidate frequency search report message to the base station 2. The handoff candidate frequency search report message is a message including report information of the result of the signal strength measurement performed in Step ST4.

Step ST8:

The base station 2 selects a base station 2 suitable for handoff, according to the handoff candidate frequency search report message transmitted by the portable terminal in Step ST7 and sets the selected base station 2 as the base station 2 of the handoff destination.

Step ST9:

The base station 2 transmits a handoff request message to the portable terminal 1. The handoff request message is a message including the information about the base station 2 of the handoff destination set by the base station 2 in Step ST8.

Step ST10:

The portable terminal 1 switches the frequency band and performs handoff to the base station 2 of the handoff destination indicated in the handoff request message transmitted from the base station 2 in Step ST9.

Step ST11:

The portable terminal 1 transmits a handoff complete message to the base station with which the portable terminal communicated before the handoff. The handoff complete message is a message for broadcasting that the handoff to the specified base station 2 is complete.

Next, an example of a handoff operation in the wireless communication system 100 (the portable terminal 1 and the base station 2) according to one embodiment will be described in detail with reference to FIG. 6.

Figure 6:
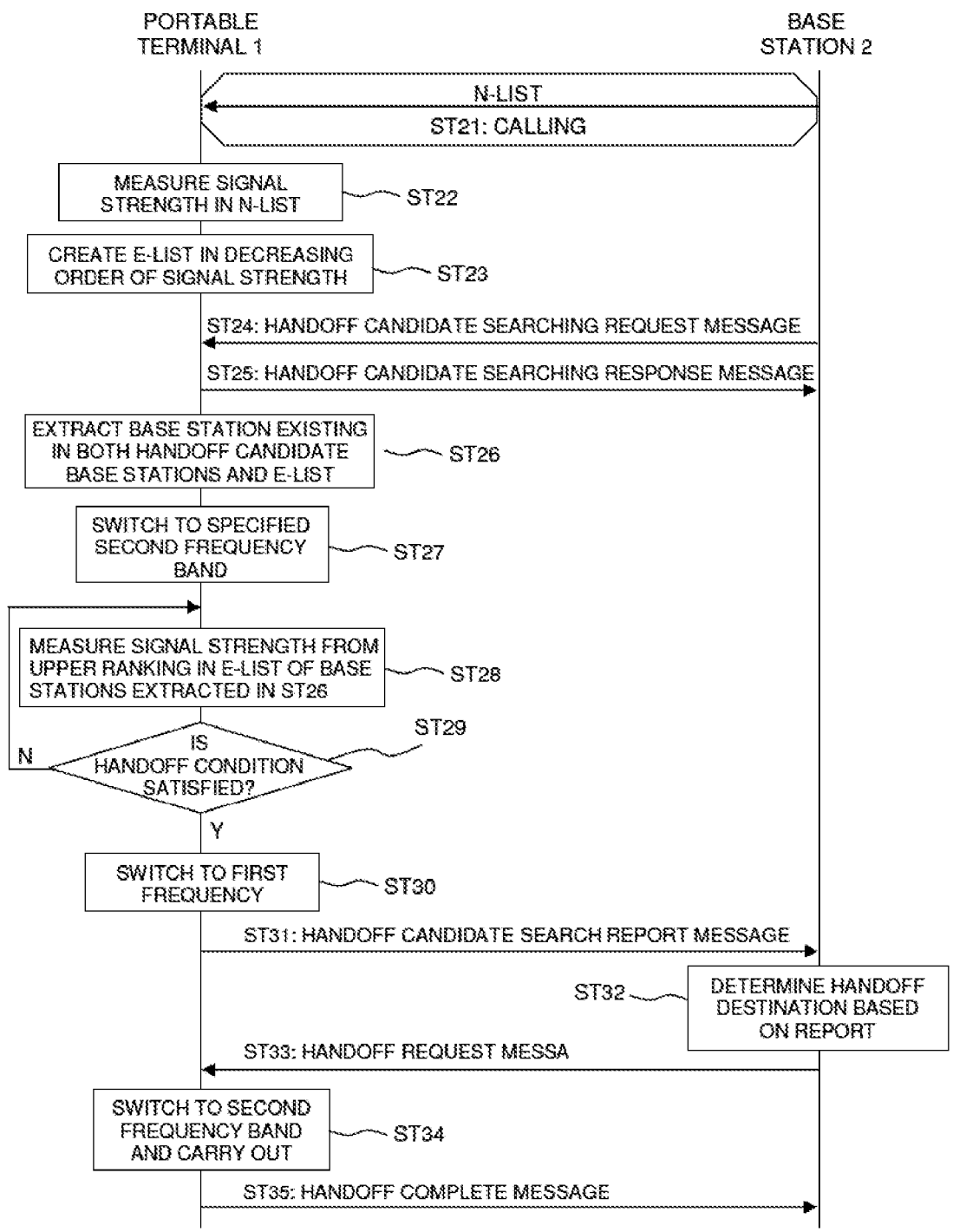
FIG. 6 is a sequence diagram showing an example of handoff operation in a wireless communication system according to one embodiment of the invention.

FIG. 6 is a sequence diagram showing an example of handoff operation between the portable terminal 1 and the base station 2 according to one embodiment.

In Step ST21, a communication call is carried out between the portable terminal 1 and the base station 2. Before the description of Step ST21, the position registration, the process of obtaining the neighboring base station list, and the soft handoff will be described.

At first, when the portable terminal 1 is powered on, it performs the position registration in a base station 2 having the best radio communication condition of the neighboring base stations 2. Namely, the portable terminal 1 comes into a stand-by mode for the base station 2 having the best radio communication condition. During the process of the position registration into the stand-by mode, the portable terminal 1 can receive the neighboring base station list (N-List/Neighbor List) describing the information about the base stations 2 near the stand-by base station 2 and their PN codes. Based on the list, the radio communication condition in the nearby base stations 2 is determined and when the portable terminal 1 moves, it accordingly selects a base station 2 having a better radio communication condition and changes the stand-by base station 2 according to a change in the radio communication condition of each base station 2. Then, the portable terminal 1 receives a new neighboring base station list from each stand-by base station 2 whenever necessary and keeps updating the stored neighboring base station list.

The case where the portable terminal 1 starts a call in the stand-by mode for one of the base stations 2, not illustrated, as described above will be further described. When the portable terminal 1 issues a request to start a call, the stand-by base station 2 specifies the channel (traffic channel) to be used for the communication to the portable terminal 1. Then, the portable terminal 1 starts the communication with the base station 2 having the best radio communication condition using the traffic channel, and hence it can make a call with another portable terminal 1 through the base station 2 and the network. Even during the communication, the portable terminal 1 receives a neighboring base station list from the communicating base station 2 whenever necessary and updates the stored neighboring base station list. Further, based on the updated neighboring base station list, the portable terminal 1 intermittently measures the signal strength (energy) from other base stations 2 in the same frequency as the communicating frequency (channel). Then, during the communication, the signal strength of the currently communicating base station 2 is compared with the signal strength of the nearby base station 2 and when the signal strength from the currently communicating base station 2 is decreased to some degree and when there is a base station 2 clearly having a better signal strength than that of the currently communicating base station, the portable terminal 1 can perform the soft handoff (handoff without changing the frequency) to the better base station 2. In FIG. 6, the state of communication thus started and maintained between the portable terminal 1 and the base station 2 is shown as Step ST21.

Step ST21:

As described above, during a call, the portable terminal 1 receives a neighboring base station list (N-List/Neighbor List) from the currently communicating base station 2 and updates the stored neighboring base station list.

Step ST22:

According to the latest N-List received from the base station 2 in Step ST21, the portable terminal 1 measures the signal strength of the pilot signal in all the base stations 2 in the list. As described above, when there is another base station 2 clearly having a better signal strength than that of the base station 2 as a result of the measurement, the soft handoff is naturally performed to this base station 2, but for the sake of simple description, the case where there is no clearly good base station 2 will be described here, according to one embodiment.

Step ST23:

Based on the signal strength of the pilot signal in the neighboring base stations measured in Step ST22, the portable terminal 1 creates a list (energy intensity list: E-List, corresponding to the first handoff candidate list) in which the base stations 2 are arranged in decreasing order of strength, for example. The E-List is a list showing the first handoff candidates of the portable terminal 1.

The processing in Step ST22 and Step ST23 is performed not only for the hard handoff. For example, it may also be performed in the soft handoff carried out by the soft handoff processing unit 121 during the communication. In the case of the soft handoff, the processing of the soft handoff is performed based on the measured signal strengths. Even when there is no handoff or no reception of a new list, the portable terminal 1 measures the signal strengths periodically and the E-List is always updated to the latest one.

A base station 2 identifying code shown in FIG. 7 is a code for identifying a sector of the neighboring base station 2. The measurement result shown in FIG. 7 indicates the measured signal strength.

Step ST24:

The base station 2 transmits a handoff candidate searching request message to the portable terminal 1. Similarly to the handoff candidate searching request message described with reference to FIG. 5, the handoff candidate searching request message is a message to make the portable terminal 1 search for a handoff candidate base station 2 in a frequency band different from the currently used frequency (first frequency band).

Step ST25:

The portable terminal 1 transmits a handoff candidate searching response message to the base station 2. The handoff candidate searching response message is a response message of acknowledgment to the handoff candidate searching request message transmitted from the base station 2 in Step ST24.

Step ST26:

The portable terminal 1 extracts such base stations 2 (or sectors) that exist in both the handoff candidate list of existing neighboring base stations 2 (e.g., the second handoff candidate list including the PN divided sector information), indicated in the handoff candidate searching request message transmitted in Step ST24, and the E-List created in Step ST23.

Figure 9:
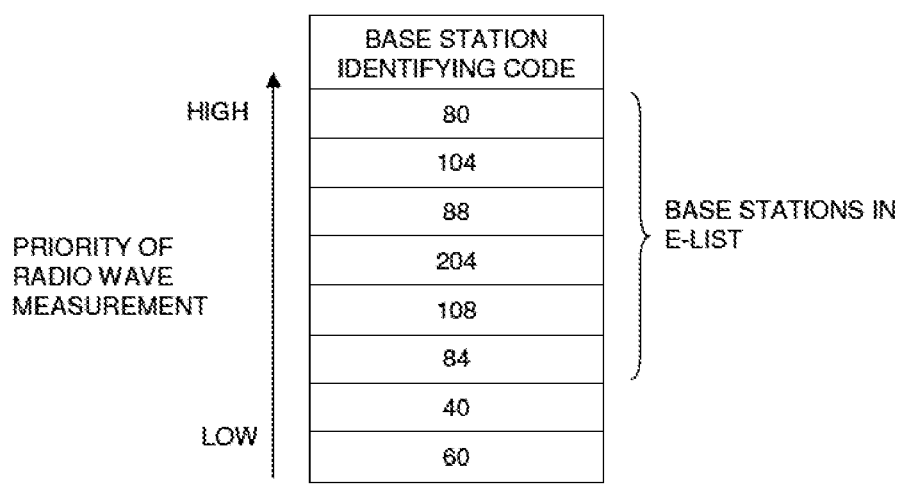
FIG. 9 shows the base stations existing in both lists of FIG. 7 and FIG. 8 according to one embodiment of the invention.

FIG. 8 shows a list including a plurality of sectors as an example of the handoff candidate base station list. As shown in FIG. 8, the base station 2 informs the portable terminal 1 of the candidate base stations 2 (sectors) for the handoff destination, and the portable terminal 1 refers to the handoff candidate base station list and the E-List shown in FIG. 7 to extract the base stations 2 existing in both lists. FIG. 9 shows the result of extracting the base stations existing in both FIG. 7 and FIG. 8.

The priority of the base station 2 existing in both the handoff base station candidate list and the E-List is raised and the priority of a base station 2 existing only in the handoff candidate base station list is lowered. Hence, the base stations 2 may be registered as in the list shown in FIG. 9.

The frequency band is different between the base stations 2 in the E-List created in Step ST23 and the base stations 2 in the handoff candidate station list extracted in Step ST26. The E-List is a list of other base stations 2 (PN divided sectors) in the Band Class having been used before the handoff and the handoff candidate station list is a list of the base stations 2 (sectors) in the Band Class not used. In Step ST26, regardless of the Band Class, such base stations 2 (sectors) that exist also in the E-List are extracted from the base stations 2 (sectors) in the handoff candidate base station list based on the base station identifying code. Further, ranking of the base stations 2 in the E-List may be determined in decreasing order of signal strength (decreasing order of intensity). The ranking of the other base stations (sectors) which are not in the E-List is determined according to the priority order in the handoff candidate base station list. Of course, various ranking techniques may be implemented without departing from the scope of the present disclosure.

Step ST27:

According to the specification information of the frequency to be switched to, which is indicated in the handoff candidate searching request message transmitted from the base station 2 in Step ST24, the portable terminal 1 switches the frequency band for communication to the specified frequency band.

Step ST28:

The signal strength in the frequency band switched to in Step ST27 is measured for the respective base stations 2 (sectors) sequentially from the upper ranking of the E-List, in other words, in decreasing order of signal strength of the pilot signal, for example, of the base stations 2 extracted in Step ST26. In other words, as shown in FIG. 9, the portable terminal 1 rearranges the base stations 2 extracted in Step ST26 in decreasing order, for example, of the ranking in the E-List and measures the signal strength of the pilot signal in the switched frequency band according to this order, according to one embodiment.

According to one embodiment, the portable terminal 1 performs the measurement for the base stations which are not included in the E-List but included in the list included in the handoff candidate searching request message after the signal strength measurement is completed in all the base stations 2 included in both the lists. When the list indicated in the handoff candidate searching request message has no base station 2 that is included in the E-List, the signal strength is measured in the order of the list shown in the handoff candidate searching request message regardless of the E-List.

Step ST29:

In Step ST28, the portable terminal 1 performs the acquisition processing for every base station 2 (sector) according to the order shown in FIG. 9, and at every measurement of the signal strength, the operation moves to Step ST30 for determining whether the base station 2 satisfies the predetermined handoff condition or not. In other words, the portable terminal 1 measures the signal strength of the respective base stations 2 sequentially in decreasing order, for example, determines whether the base station 2 satisfies the predetermined condition at every measurement of the signal strength for every base station 2, returns the operation to Step ST28 when the base station 2 does not satisfy the predetermined handoff condition, and measures the signal strength of the next base station 2 in the ranking. According to one embodiment, in Step ST28, signal strength is measured in a base station 2 next to the base station 2 determined not to satisfy the condition, in the order shown in the exemplary list of FIG. 9.

On the other hand, according to one embodiment, when the portable terminal 1 satisfies the predetermined handoff condition in Step ST29, the process moves to Step ST30. Thus, since the portable terminal 1 can find such a base station 2 that satisfies the handoff condition earlier and report the found base station 2 to the original base station 2 as soon as it is found, the time for completing the handoff can be shortened and the disconnected period of time caused by the handoff (e.g., the period of the time when the portable terminal 1 is switching the frequency) can be as short as possible. The predetermined handoff condition is, for example, a condition that the signal strength is a predetermined value. Of course, other conditions may be included in the predetermined handoff condition as well.

Step ST30:

The portable terminal 1 switches the frequency switched in Step ST27 into the original frequency having been used for communication with the original base station 2 in Step ST21.

Step ST31:

The portable terminal 1 transmits a handoff candidate frequency search report message to the original base station 2 having been used for communication in Step ST21. The handoff candidate frequency search report message may include the report information of the result of the signal strength measurement performed in Step ST28.

Step ST32:

Based on the handoff candidate frequency search report message transmitted by the portable terminal 1 in Step ST31, the base station 2 sets a base station 2 suitable for handoff as the handoff destination base station 2.

According to one embodiment, the information of the sector (base station 2) indicating the channel estimated to be in the best radio communication condition (e.g., having the highest signal strength) at the time of transmitting the report should be informed by the portable terminal 1. Therefore, in Step ST32, the base station 2 determines whether or not a handoff (in particular, the handoff of the frequency band specified in the hard handoff) to the reported candidate base station 2 (sector) can be permitted according to the traffic state at the time of receiving the report from the portable terminal 1. When the base station 2 determines that the handoff to the reported base station 2 can be permitted, it sets this base station 2 (sector) as the handoff destination.

Step ST33:

The base station 2 transmits a handoff request message to the portable terminal 1. The handoff request message is a message including the information on the base station 2 (channel) of the handoff destination determined by the original base station 2 in Step ST32, according to one embodiment.

Step ST34:

Based on the information on the base station 2 of the handoff destination included in the handoff request message transmitted from the original base station 2 in Step ST33, the portable terminal 1 switches the frequency band to carry out the handoff, according to one embodiment.

Step ST35:

The portable terminal 1 transmits a handoff complete message to the original base station 2 communicated with in Step ST21 in the communication system of the handoff destination, according to one embodiment. The handoff complete message is a message broadcasting that the handoff to the specified base station 2 (sector) is completed, among other possible information.

Hereinafter, the example of the MAHHO operation shown in FIG. 5 and the example of the operation according to FIG. 6 are compared.

In the example of the operation according to the embodiment depicted in FIG. 6, the portable terminal 1 creates the E-List in advance in Step ST22 and Step ST23, in which the neighboring base stations 2 are listed in decreasing order, for example, of signal strength of the pilot signal in the currently used frequency. In the case where the base station 2 transmits the same pilot signal even when the frequency band is different, it can be assumed that, in the base station 2 having strong signal strength of the pilot signal in the currently used frequency band, the signal strength of the pilot signal remains strong even in the switched frequency band, based on the assumption that the signal strength of the pilot signal is approximately the same even in the different frequency band. According to one embodiment, the portable terminal 1 can regard a base station 2 in the upper ranking in the E-List as the base station 2 having strong signal strength of the pilot signal in the currently used frequency and can find a base station 2 satisfying the handoff condition at an earlier stage by performing the measurement of the signal strength in decreasing order, for example, of the signal strength in the E-List when measuring the signal strength after the frequency band is switched.

When the portable terminal 1 is far from an area covered by the base stations described in the E-List, for example, while the portable terminal 1 is moving at high speed, the base stations 2 described in the E-List may not agree with the base stations 2 specified in the handoff candidate base station list from the start of the hard handoff processing. In this case, since the base station 2 specified in the handoff candidate list is always a target for measurement of the signal strength, a failure in finding a handoff candidate base station 2 can be avoided according to various embodiments.

As understood from the comparison between FIG. 5 and FIG. 6, when the base station 2 transmits the same pilot signal before and after switching the frequency band, the wireless communication system 100 according to one embodiment can be realized by only changing the operation of the portable terminal 1 and it is not necessary to change the operation of the base station 2. Since many of the base stations 2 established in Japan, for example at present transmit the same pilot signal before and after switching the frequency band, it may not be necessary to change the operation of the base station 2 in order to realize the wireless communication system 100 of various embodiments described herein. When the base station 2 does not transmit the same pilot signal before and after switching the frequency band, though the effect is not expected even when the portable terminal 1 is used, it is possible to perform a handoff in the same way as in the example of FIG. 5 and there is no disadvantage in using the portable terminal 1 of the wireless communication system 100, according to various embodiments.

Although the example in which one base station has only one sector has been described for the sake of simplifying the description of the invention, the same effect can be obtained also when, for example, three PN codes or more are assigned to one base station and one base station has three or more sectors.

According to one embodiment, it can also be considered that a handoff candidate base station 2 specified by the base station 2 is a channel of the handoff candidate and that the PN-divided sector is specified as the handoff candidate. Also in the E-List, the measurement of signal strength on the PN around the portable terminal 1 in the used Band Class may be performed at any time in order to perform the soft handoff between the sectors smoothly, and this can also be considered as the signal strength measurement for every sector.

The invention is not limited to the above-described embodiment.

Namely, in carrying out certain aspects the invention, various modifications, combinations, sub-combinations, and substitutions may be performed on the components of the above-described embodiments within the technical scope of the invention and its equivalent.

For example, in the above-described embodiments, although the wireless communication system 100 compatible with three kinds of frequency bands, the old 800 MHz band, the new 800 MHz band, and the 2 GHz band has been described, the invention is not limited to these frequency bands. One skilled in the art would understand that a wireless communication system 100 compatible to a frequency band other than the above-described three is possible and the number of the kinds of compatible frequency bands is not limited.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

What is claimed is:

1. A portable terminal device which maintains wireless communication with a plurality of base stations in a communication network, comprising:

a communication unit communicable in a plurality of frequency bands and configured to select one frequency band from the plurality of frequency bands to perform wireless communication; and a control unit configured to change the frequency band for use in the wireless communication by the communication unit to perform the wireless communication, wherein the control unit includes a first handoff processing unit which, when a neighboring base station list including information of one or more neighboring base stations is received from a currently communicating base station, measures a signal strength of a transmission signal for each of the one or more neighboring base stations in the frequency band being used by the communication unit, creates a first handoff candidate list in which one or more handoff candidates in a same frequency band are recorded in decreasing order of signal strength, and performs a handoff using the first handoff candidate list, and a second handoff processing unit which, when a second handoff candidate list including information for switching the communicating frequency band and one or more different frequency band handoff candidates is received from a currently communicating base station, measures signal strength of one or more base stations included in the second handoff candidate list, stops measuring signal strength of the one or more base stations included in the second handoff candidate list when a handoff condition is satisfied, reports the result of the signal strength measurement to the currently communicating base station, and performs a handoff based on a response to the report upon receipt of the response from the communication unit.

2. The portable terminal device according to claim 1, wherein the second handoff processing unit is configured to measure signal strength of the one or more handoff candidates included in the second handoff candidate list sequentially starting from the handoff candidate having the best signal strength in decreasing order of the handoff candidates in the first handoff candidate list.

3. The portable terminal device according to claim 2, wherein when one handoff candidate whose signal strength satisfies a predetermined condition is extracted from the one or more handoff candidates included in the second handoff candidate list, the second handoff processing unit is configured to report the extracted handoff candidate to the currently communicating base station.

4. The portable terminal device according to claim 2, wherein the control unit is configured to measure the signal strength based on a pilot signal of a handoff candidate base station received by the communication unit.

5. The portable terminal device according to claim 1, wherein the second handoff processing unit determines whether one or more of the one or more base stations included in the second handoff candidate list is also included in the first handoff candidate list, and measures first the signal strength of the one or more base stations included in both the first handoff candidate list and the second handoff candidate list.

6. A handoff method for maintaining wireless communication in a wireless communication system comprising a plurality of base stations and a portable terminal device configured to perform wireless communication with one or more of the plurality of base stations, comprising:
receiving a neighboring base station list including information on one or more neighboring base stations from a currently communicating base station;
measuring signal strength of a transmission signal for each of the one or more neighboring base stations in a currently used frequency band;
generating a first handoff candidate list in which one or more handoff candidates of the same frequency band as the currently used frequency hand are recorded in decreasing order of signal strength determined by the measuring the signal strength of the transmission signal for each of the one or more neighboring base stations;
performing a handoff using the first handoff candidate list without switching the used frequency band;
receiving a second handoff candidate list including switching information of the used frequency band and one or more different frequency band handoff candidates from the currently communicating base station;
switching communication to a frequency band based on the switching information, and measuring a signal strength of the one or more handoff candidates included in the second handoff candidate list;
stopping the measuring of signal strength of the one or more handoff candidates included in the second handoff candidate list when a handoff condition is satisfied,
reporting the result of the measured signal strength of the one or more handoff candidates to the currently communicating base station using the original frequency band;
receiving a response to the reporting at the portable terminal; and
performing a handoff based on the response;
wherein measuring the signal strength of the one or more handoff candidates included in the second handoff candidate list comprises sequentially starting from the handoff candidate having a best signal strength in decreasing order of the handoff candidates in the first handoff candidate list.

7. The handoff method according to claim 6, wherein when one handoff candidate whose signal strength satisfies a predetermined condition is extracted from the one or more handoff candidates included in the second handoff candidate list, the reporting step reports the extracted handoff candidate to the currently communicating base station.

8. The handoff method according to claim 6, wherein the measuring the signal strength of the transmission signal for each of the one or more neighboring base stations and the measuring signal strength of the one or more handoff candidates included in the second handoff candidate list perform one or more signal strength measurements based on a pilot signal of a handoff candidate base station received by the portable terminal.

9. The handoff method according to claim 6, wherein the neighboring base station list is transmitted by the currently communicating base station.

10. The handoff method according to claim 6, wherein the switching information and the second handoff candidate list are transmitted by the currently communicating base station.

* * * * *